July 26, 1932. J. BIJUR 1,868,687
SPRING EYE SUSPENSION
Filed Oct. 8, 1924 4 Sheets-Sheet 2

INVENTOR
Joseph Bijur
BY
Dean, Fairbank, Obright & Hirsch
his ATTORNEYS

July 26, 1932.  J. BIJUR  1,868,687

SPRING EYE SUSPENSION

Filed Oct. 8, 1924   4 Sheets-Sheet 4

INVENTOR
Joseph Bijur
BY
his ATTORNEYS

Patented July 26, 1932

1,868,687

UNITED STATES PATENT OFFICE

JOSEPH BIJUR, OF NEW YORK, N. Y., ASSIGNOR, BY MESNE ASSIGNMENTS, TO AUTO RESEARCH CORPORATION, A CORPORATION OF DELAWARE

SPRING EYE SUSPENSION

Application filed October 8, 1924. Serial No. 742,283.

My present invention relates primarily to spring suspensions, more especially to the hinging mounts for the eyes of the leaf springs of motor vehicles.

The invention is applicable not only to the shackle hinge end of the spring but also to the hinge at the vehicle frame, whether of the shackle or the spring eye, and is also applicable to the hinge connections between the elements of a three-quarter or full elliptic spring.

It is among the objects of the invention to provide a hinging spring suspension or connection of simple and rugged construction, easy to assemble and substantially proof against the entry of dirt, dust or water either to the rocking or to the thrust bearing surface of the hinge, which suspension requires a yoke forging or shackle assembly of but small width, and a substantially standard bolt made from small stock and threaded at but one end, which permits of ready take-up for wear without destroying the dust-proof relation and in which any damaged element of the dust-proofing means is readily replaceable.

Another object is to provide a hinge of the type mentioned which presents thrust faces of large area and in the shackle embodiment is unlikely to yield, cock or skew under adverse conditions as when the vehicle is rounding a corner at high speed.

According to the invention, I avoid a vertical crack, however small, through which dirt or dust might drop into the construction and find its way to the bearing surface. For this purpose, there is associated with each end of the bolt or bearing pin, a metallic construction comprising two concentric parts, one telescoped into the other, one rigid with the bolt, the other rigid with the spring or other eye encircling the bolt. These concentric parts preferably include a cup-shaped member, which is desirably rigid with the shackle, but which may also be rigid with the spring eye or with the body of the vehicle and in the bottom of this cup is preferably positioned a dust and water excluding washer, usually of a compressible material, which is pressed into the cup by the spring or other eye encircling the bearing pin or by an element rigid therewith.

In one embodiment, the diameter of the inner of the telescoped elements is substantially equal to that of the outer for small clearance but is of reduced diameter at the part corresponding to the rim of the outer element, so that matter falling onto the telescoped structure would drop off therefrom rather than to enter the horizontal crack between the telescoped parts which it would have to pass on its way to the bearing.

In another embodiment, an annular felt washer lodged in a corresponding annular groove determined by the telescoped members, is tightly compressed and substantially completely enclosed therebetween to block the path of entry for foreign matter to the bearings. In a preferred specific construction, the spring eye or frame forging is provided with wear bushing thimbles pressfitted thereinto, each provided with a flange that presses against the end of the eye and against the washer. A metal plate of diameter larger than said eye over which is telescoped a flange or a thrust member pressed against the end of the bushing may also be used. The felt dust excluding washer encircles the flange of the thimble and is pressed between the flanged thrust member and the metal plate, the flange of the former extending beyond the felt washer.

The spring eye assembly comprising the spring eye with its bushings, metal plates, thrust members and with or without felt rings, depending on the embodiment employed, is inserted as an assembled unit between the jaws of the frame yoke forging, or between the link elements of a unitary shackle forging, whereupon the bearing bolt is applied through the bearing assembly. Where a unitary shackle forging is employed, a bearing assembly of the type referred to may be first applied to the frame eye, and the link element of the shackle forging then straddled thereover. Preferably keys or other locking constructions are provided for retaining the thrust members against rotation relative to the yoke or shackle forging. The bolt nut effects telescoping of the dust-excluding structure to embrace only part of the thickness of the projecting structure rigid with the eye, whereby it will clear the edges of the eye, so that no obstruction will be interposed to the rocking movement in operation, and take-up will not damage the dust-excluding structure.

For take-up purposes a collar encircles the bolt near one end thereof and is disposed in one of the arms of the yoke forging or links of the shackle forging. The take-up collar exerts pressure upon the bearing assembly when the bolt nut is tightened, taking up slack, enhancing without impairing, however, the dust-tightness of the construction, since the extent of telescoping of the dust-excluding metal elements is increased by tightening the bolt nut.

In the accompanying drawings in which is shown one of various possible embodiments of the several features of the invention.

Figure 1:
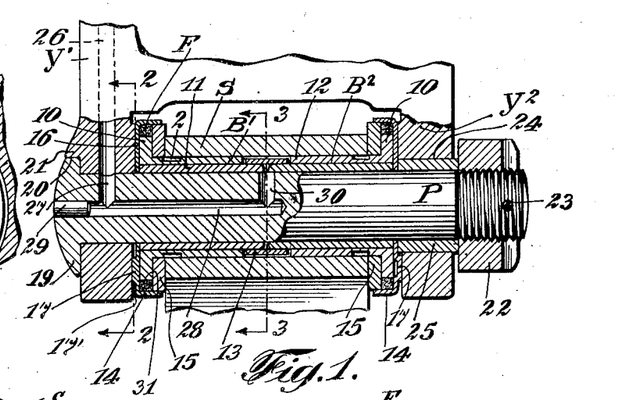
Fig. 1 is a view in longitudinal cross-section of one form of spring suspension.
Figure 2:
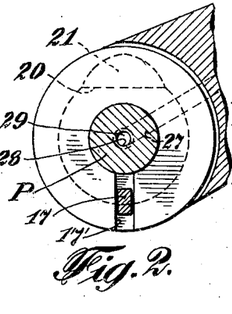
Figs. 2 and 3 are sectional views taken respectively along the lines 2—2 and 3—3 of Fig. 1.
Figure 3:
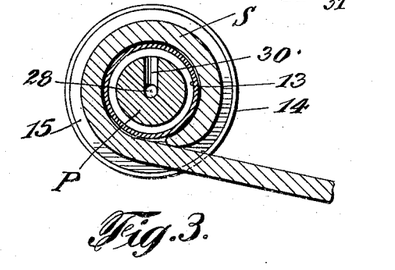

In Figs. 1 to 3 of the drawings, I have shown a preferred form of spring eye mount or suspension. The spring eye S has a composite bushing formed of two elements B′ and B² telescoped and press-fitted thereinto from opposite ends. Each of the bushing elements preferably comprises a brass liner 11 and a pressed steel thimble 12 with an integral flange 10 at its outer end. Encircling the inner ends of the liner members which preferably project beyond the steel elements is a band 13 of tubing which, as will appear most clearly from Fig. 3, serves to prevent the escape of lubricant from between the adjoining ends of the split bushing peripherally of and from the spring eye S.

To prevent the entry of dust to the bearing surfaces, a felt washer F preferably encircles the rim of each of the bushing thimbles and is encircled by the flange of a sheet metal thrust cup 16 pressing against the end of the bushing and having its rim 14 extending beyond the entire thickness of the washer F. The inner face of the felt washer F is retained by a metal annulus 15 encircling the thimble elements B′ and B² and pressed between the flange 10 and the end of the eye S and telescoped into the cup to compress the washer F. Each of the cups 16 has an embossed projection 17 thereon extending into a groove 17′ in the eye of the corresponding yoke arms Y′ of the fork on the vehicle frame, which carries the spring eye S. The spring bolt P extends through the yoke arms Y and the bushings B and is provided with a head 19 having a flat 20 coacting with an integral lug 21 on one of the yoke arms Y′, thereby to retain the bolt against rotation. The other end of the bolt has threaded thereon a nut 22 which may be locked in position by a cotted pin 23 to maintain the parts in assembled relation.

In order to take up wear, the yoke arm Y² is formed with an eye 24 of larger diameter than that of yoke arm Y′ within which larger eye, fits a take-up collar 25 snugly encircling the bolt and protruding beyond the outer face of the yoke arm Y², the assembled parts of the spring eye suspension being tightly pressed together by pressure transmitted through the nut 22 and the take-up collar 25. The lubricant may be admitted to the bearing surface through an oil cup which may be disposed at the end of the bolt or, as indicated in the drawings from some more remote source of supply, such as a lubricant cup mounted on the frame or from a centralized distributing lubricating system. For the latter purpose, I have indicated a duct 26 through the yoke arm Y′, which duct registers with a corresponding radial duct 27 in the bolt P when the latter is fixed in the sole position permitted by the lug 21, in turn, communicating through an axial bore 28 plugged as at 29 at its outer end, which latter, in turn, communicates through a central radial bore 30 with the bearing surface between the spring bushing and the bolt.

For assembly, one of the bushings B′ with the sleeve 13 previously fixed thereover is press-fitted into one end of the eye S, the annulus 15 having, of course, first been passed over the bushing, whereupon the other bushing B² with the corresponding annulus 15 disposed thereover is forced into the opposite end of the spring eye. Each of the felt washers F is then slipped over the rim of the corresponding bushing element, said rim being preferably tapered as at 31 to facilitate such assembly, whereupon the thrust cups 16 are applied in obvious manner, the annuli 15 and felt ring F maintaining said cups accurately positioned. The assembly of spring bushings B, felt washers F and thrust cups 16 and annuli 15 is then passed between the arms of the yoke, the embossments 17 being directed into the corresponding grooves, whereupon the bolt P is passed through the yoke arms and the bushing, and accurately positioned by the flat 20 against lug 21, and then the take-up collar 25 is passed over the bolt and positioned in the eye. The nut 22 is finally threaded in position to exert sufficient pressure through the take-up collar 25 to draw the parts together, thereby causing the cups 16 to telescope over the annuli 15 to compress the washers F. It will be understood that the felt washers F are initially of thickness substantially in excess of the thickness of flange 10 and will in the tightening of nut 22, as indicated, be compressed to the thickness of said flange and will, as is apparent, accordingly swell in a radial direction to completely fill the annular chamber between the annulus 15, the cup 16 and the rim 31 of flange 10.

Figure 4:
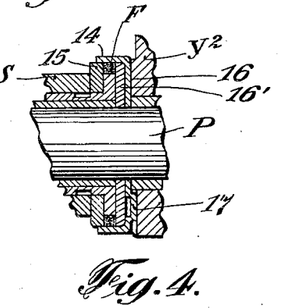
Fig. 4 is a fragmentary view of a modification.

In the relative rocking action between the bolt and link assembly on the one hand, and the spring eye and bushing assembly, on the other, the bushing B moves about the fixed bolt P, while the surfaces between the bushing flanges 10 and the thrust cups 16 constitute the thrust bearings, since the bushing is a rigid unit with the spring eye and the cup 16 is keyed at 17, as heretofore described, to the yoke arm Y. Lubricant admitted to the bearing surface will not readily escape from the snug joint between the bolt and the eye of arm Y′, nor from the fit between the take-up collar 25 and the bolt, and the retaining collar 13 will prevent any escape of oil from between the two elements of the bushing. The lubricant will, accordingly, be confined at the bearing surface about the length of the bolt and will pass radially outward from between the ends 10 of the bushing and the thrust cups 16 to lubricate the thrust surface therebetwen, which surfaces is encircled by the continuous circular dust-excluding structure. If desired, there may be press-fitted into the thrust cups 16 a hardened steel washer 16′ (Fig. 4) to afford a wear surface of greater durability.

It will be seen that in normal operation, dust, dirt or water are effectively excluded from the bearing surface of the bolt. There is no vertical crack, however small, through which dirt, dust or water could drop into the structure either to the bearing or even to the felt. Dirt falling onto the felt ring enclosure 14—15 in order to enter the bearing surface would have to creep horizontally lengthwise of the flange 14, past the inner edge of annulus 15 before it could even reach the felt F, and thence it would have to travel the entire felt thickness and inward the entire felt width, before it could reach the thrust bearing and then the entire radius of the latter before it could reach the bolt bearing surface. Washer F being tightly compressed against the adjacent metal surface, dirt will not readily pass by it, but is caught by the rough and oily felt. Thus, dirt, dust and water are effectively excluded from the bearing or wearing surfaces.

To compensate for wear at the thrust bearing surface which would cause looseness, manifested by a rattling sound, it is merely necessary to tighten the nut 22, thereby forcing inward the take-up bushing 25 which will accordingly, take up any looseness in the various parts between the thrust cups 16, the yoke arms Y and the bushing assembly. In this take-up adjustment, it will be seen that the initial pressure on the felt washers is increased, as is the extent of overlap of the rims 14 of the thrust cups 16 with respect to the annuli 15.

Thus, I have provided a construction involving few and simple parts, readily produced at small expense, easily assembled and involving no substantial increase in the dimensions of standard spring eye constructions, nor protruding parts likely to be knocked off. The construction presents no vertical crack or opening through which dust or dirt can enter to the bearing surface and involves felt rings at all times under compression and themselves completely enclosed to block the entry of dirt or dust. The construction permits take-up for wear without destroying the dirt-tight character, since in the take-up, the extent of overlap or telescoping between the thrust cups 16 and the annuli 15 is increased. The yoke is of width only slightly in excess of the length of the spring eye, avoiding bulky enlargements. The bolt is of substantially standard dimensions and threaded at but one end, and can be made from relatively small stock, since it has no parts of greatly enlarged diameter. Preferably the bushing elements B are provided with peripheral grooves 2 near the flanges 26, the widths of which, as shown, preferably extend in the assembled eye inward from the inner surface of plate 15. At this groove any shaving cut from the bushing in forcing the same into the more or less irregular spring eye, will obviously terminate and fall off, rather than pack between the washer 15 and the end of the eye.

In the other embodiments now to be described, I use the same letters of reference as in Figs. 1 to 4, to designate the corresponding parts.

Figure 5:
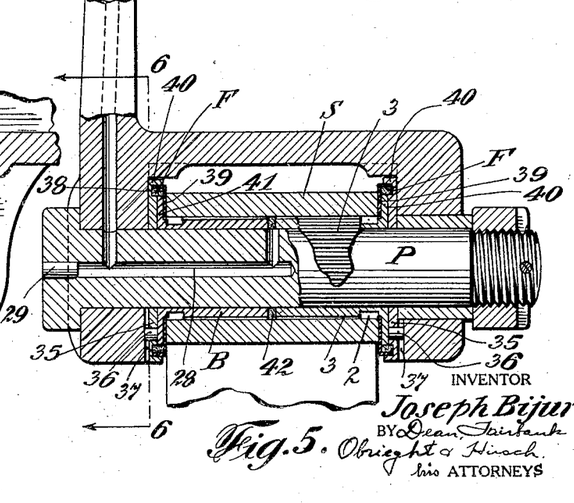
Fig. 5 is a view similar to Fig. 1 of a modification.
Figure 6:
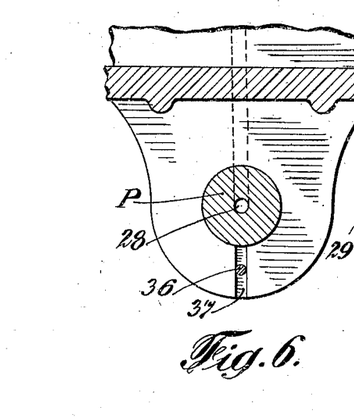
Fig. 6 is a sectional view taken along the line 6—6 of Fig. 5.

In Figs. 5 and 6 is shown a modification in which the difference between the length of the spring eye and the distance between the yoke arms Y is less than in Fig. 1. In this construction, instead of the thrust cup 16, I provide a thrust plate 35 provided with a stud 36 press-fitted thereinto and extending into a corresponding groove 37 in the yoke. The annular felt washer F is lodged in a corresponding groove 38 extending peripherally at the thrust plate and is retained in position by a sheet metal cupped washer 39 having a rim 40 extending thereabout substantially in contact with the outer wall of the groove 28. Washer 39 is clamped between the spring eye S and the flange 41 of the bushing element B. In lieu of the oil-retaining ring 13 in Fig. 1, I have in this embodiment shown a leather washer 42 compressed between the adjoining ends of the bushing halves, each of which is shown illustratively made in a single unitary piece. The mode of assembly, operation and mode of adjustment of the present construction will be apparent from that shown in Figs. 1 to 3.

In addition to the peripheral groove 2 in the bushing B, I have here shown the outer surface of said bushing knurled or milled as at 3. By this arrangement, any shaving cut from the bushing in forcing it into the eye will be but a narrow sliver ordinarily cut from the edge of one of the knurl ridges, so that a greater variation in the eye can be cared for.

Figures 7, 8:
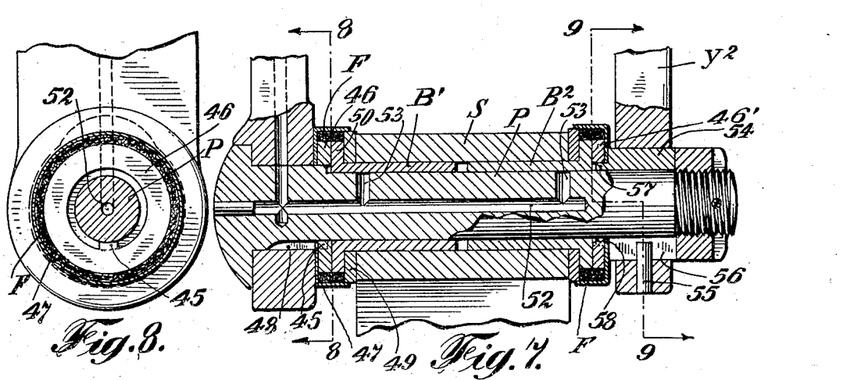
Fig. 7 is a view similar to Fig. 1 of another modification.
Figs. 8 and 9 are transverse sectional views taken respectively along the lines 8—8 and 9—9 of Fig. 7.
Figure 9:
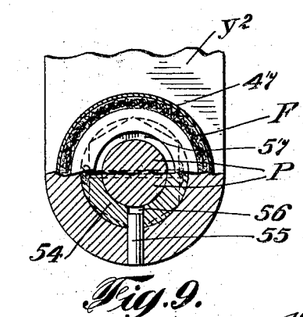

In the modification of Figs. 7 to 9, a key 45 in a hardened steel thrust washer 46 and a similar key in the sheet metal retaining cup 47 for the felt washer F, both are locked in a keyway 48 longitudinally of the bolt P. The edge of the retaining cup 47 extends beyond the limiting plane of the felt washer F to between the limiting planes of metal annulus 49, which latter is clamped as in Fig. 1 between the bushing flange 50 and the spring eye S. In this embodiment, I have shown the two bushing elements B' and B² devoid of any oil retaining collar such as shown in Figs. 1 and 5, the longitudinal oil conveying bore 52 in the bolt having radial outlets 53, one near the yoke end of each of the bushing halves, so that the lubricant must pass the length of the bushing and lubricate the bearing surface thereof, before any can escape from between the ends of the bushing halves out from the eye of the spring.

The take-up collar 54 is here shown secured with respect to the corresponding yoke arm Y² by means of a friction-fitted pin 55 extending longitudinally of the latter into a corresponding groove 56 longitudinally of the collar 54, the thrust disk 46' being mounted on a reduced hub 57 of said collar and locked by a key and slot connection 58 with respect hereto.

Figure 10:
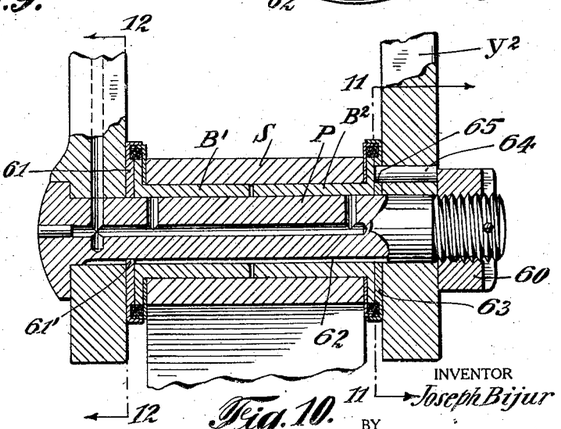
Fig. 10 is a view similar to Fig. 1 of a further modification.
Figure 11:
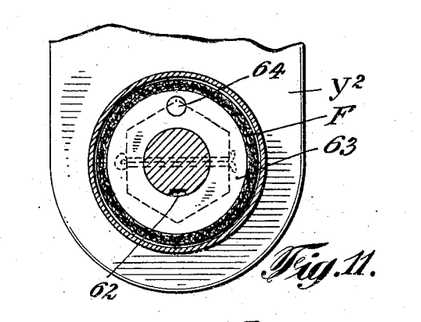
Figs. 11 and 12 are sectional views taken respectively along lines 11—11 and 12—12 of Fig. 10.
Figure 12:
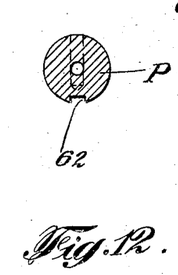

In Figs. 10 to 12 is shown a construction generally similar to that shown in Figs. 5 and 6, but devoid of take-up collar, the yoke arms having sufficient yield to be drawn together for adjustment purposes, when the nut 60 is tightened. The bushing construction there shown is similar to that indicated in Fig. 5. The thrust plate 61 is keyed with respect to the bolt and link assembly by an integral key 61' thereon fitting into a corresponding longitudinal groove 62 in the bolt P. The thrust plate 63 at the opposite end is illustratively shown keyed with respect to the corresponding yoke arm Y² by an alternative construction, comprising a floating lock pin 64 transversely through the thickness of the arm Y² and projecting into a corresponding aperture 65 in the thrust washer and retained by the nut 60 against escape.

Figure 13:
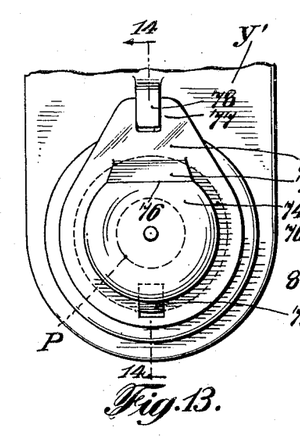
Fig. 13 is a fragmentary end view of a modification.
Figure 14:
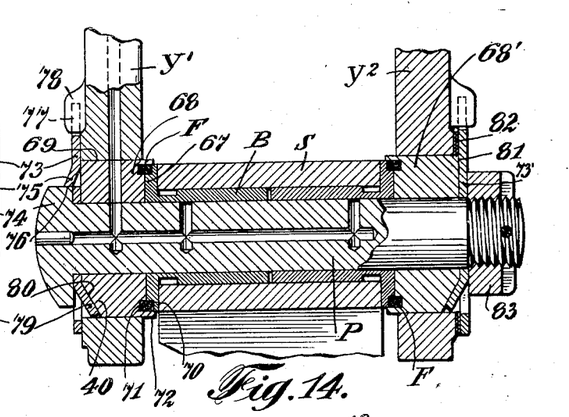
Fig. 14 is a view in longitudinal cross-section taken along the line 14—14 of Fig. 13.

In Figs. 13 and 14 is shown a further modification in which the distance between the arms Y'—Y² of the yoke may be substantially exactly the length of the bushing for the spring eye. The spring bolt and the bushing which are of construction generally similar to that shown in Fig. 6, are rendered dust-tight by annular felt washers F, tightly compressed between the flanges 67 of the bushings B and collars 68, substantially of the thickness of the yoke arms, and of diameter greater than that of flanges 67 and fitting in corresponding openings or eyes 69 in the yoke arms. The flange 67 has a circumferential rectangular seat 70 for the felt ring F and the collar has a coaxial groove 71 of corresponding diameter to accommodate the felt. Preferably the periphery of the collar protrudes as at 72 beyond the limiting plane of the felt, so that the latter is completely enclosed. A stamped steel locking washer 73 is clamped between the collar 68 and the head 74 of the bolt and has a locking tongue 75 coacting with the flat 76 of the bolt head, a yoke 77 to straddle a corresponding integral lug 78 on the corresponding yoke arm and a lug 79 struck in from the plane thereof into a corresponding notch 80 in the collar 68 for locking with respect to the latter. The collar 68' at the nut end of the bolt, is of somewhat greater thickness than the corresponding arm Y² projecting therebeyond as at 81, annular shims 82 being interposed between said arm and the locking washer 73' which is like washer 73, except that it lacks the eye 75 and is pressed toward collar 68' by the nut 83.

To assemble the construction, the spring eye S with the bushings B press-fitted thereinto, is disposed between the arms of the yoke. The bolt P with the collar 68, to which lock plate 73 has been previously affixed as shown in the drawings, is applied in position, the collar 68 passing into eye 69 of the yoke arm Y', with the steel lock plate 73 correctly positioned with respect to the lug 78. The collar 68' is now passed over the opposite end of the bolt into the eye of arm Y², shims 82 are positioned to encircle the thickness of collar 68' protruding beyond the surface of arm Y², whereupon washer 73' is applied and finally nut 83. To compensate for wear, it is merely necessary to remove the nut 83 and the plate 73', to take out one or more of the shims 82 and then reassemble, whereupon the nut and the locking plate can be drawn nearer to the head 74 of the bolt by the thickness of the shims removed, thereby compensating for wear.

Figures 15, 16, 19:
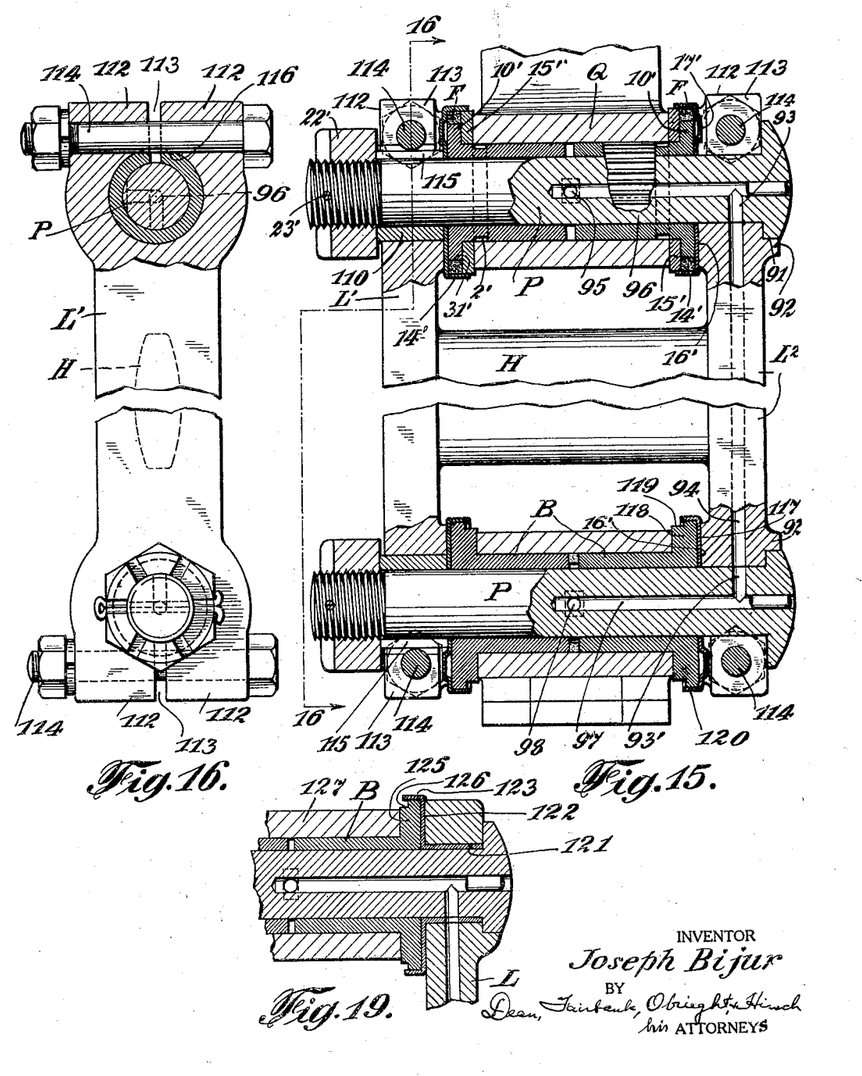
Fig. 15 is a fragmentary view in longitudinal cross-section of a shackle embodiment.
Fig. 16 is a longitudinal sectional view taken along the line 16—16 of Fig. 15.
Fig. 19 is a fragmentary view of a modification of the embodiment shown in Fig. 17.

A desirable application of my present invention to a spring shackle is shown in Figs. 15 and 16 and includes a unitary forging in which the two shackle links L' and L² are integrally connected by an intervening cross bar H. I prefer to employ here a bearing assembly construction about each of the bolts P adapted to be straddled as an assembled unit by the links, substantially as in any of the embodiments shown in Figs. 1 to 14.

I have illustratively shown in Fig. 15 a bearing assembly at the upper or frame end of the shackle similar to that shown in Fig. 1, omitting, however, the ring 13 between the bushings shown in Fig. 1, since in this case, the bearing forging Q is preferably continuous, and oil would not escape therefrom. The parts of the bearing have the same reference numerals as in Fig. 1 primed, however, and need, therefore, not be separately described. The take-up for wear is accomplished as in Fig. 1 by a take-up collar 110. In order to securely clamp the bolt with respect to the links, I have here illustratively shown the link as split as at 113, the two jaws 112 thereof being drawn together by a bolt 114 transversely therethrough. The take-up collar for this purpose is split as at 115 so that the clamping force through the jaws is transmitted through said collar to the bolt. Preferably, the split collar is flattened as at 116 to accommodate the surface of the bolt 114, thereby assuring the positioning of the split end of the collar in proper relation to be drawn together by the tightening on the bolt, where as will be apparent, if the split ends were displaced say ninety degrees from the position shown, the collar would not be effectively drawn together.

While an arrangement of bearing assembly identical with that for the upper bolt might be used at the lower bolt of the shackle upon which the spring eye is supported, supplemented in this case preferably by an oil confining ring similar to that shown at 13 in Fig. 1 or leather washer 42' similar to the washer 42 in Fig. 5, I have here illustratively shown an alternative embodiment devoid of a felt ring. In this construction, the thrust cup 117 is identical with that shown at 16'. Each of the spring bushing thimbles B has a thickened flange 118, telescoping into the thrust cup, preferably substantially contacting the flange thereof peripherally and of reduced diameter as at 119 at its inner end, the cup flange 120 extending partway across the thickness of said reduced portion. It will be seen that by this arrangement also, the spring eye is free to rock in operation without interference by the flange of the thrust cup or by any other part of the construction. The bushing B with flange 118 being press-fitted into the spring eye, dirt or dust could not pass along the abutting surfaces therebetween. Dust or dirt dropping onto the end of the bearing or rim 120, would naturally drop therefrom onto the portion 119 of reduced diameter of the flange, but would not be likely to pass along the minute peripheral horizontal crack between the outer part of the thimble flange and thrust cup rim.

In the present construction, the bearing surfaces of both bolts may be supplied with lubricant from a single source of supply. To this end, an appropriate fitting (not shown) such as an oil cup, or the outer end of a pipe leading from a more remote source is applied in the fixed frame forging and leads from a radial duct 95 into a longitudinal duct 96, preferably in the frame bolt, communicating with a radial duct 93 in said bolt, a radial duct 93' in the spring bolt similarly communicating with a longitudinal duct 97 that leads through a radial duct 98 at its middle to the spring bearing bolt. Both bolts P are of usual standard construction and are each provided with a flat 91 coacting with a corresponding lug 92 on the link L², so that they are accurately positioned for registry of the radial oil ducts 93 and 93' thereof with a connecting longitudinal oil duct 94 in link L².

It will be seen that the thrust face at each end of each of the links with respect to the corresponding bushing is the entire area of the bushing flange 118 and this is sufficiently large to effectively maintain the links against cocking, that is, against angular displacement from perpendicularity relative to the bolts, even under the centrifugal force engendered when the vehicle rounds a corner at substantial speed.

Of course, the felt-less arrangement just described shown at the lower bolt in Fig. 15 could be used effectively for the upper bolt of the shackle shown or with suitable modifications apparent to those skilled in the art, to any of the embodiments of spring eye shown in Figs. 1 to 14. The mode of assembly of the shackle of Fig. 15 will be understood from previous descriptions. It may be briefly noted here, that the bushing, thrust cap and associated elements are first applied at the frame eye, the shackle forging straddled over said assembly and the bolt passed therethrough and its nut tightened. The bushing thrust cup and associated elements being then applied to the spring eye, it is passed between the lower ends of the links and the spring bolt is passed into position and its nut applied, the thrust collars 110 effecting the take-up, whereupon bolts 114 are tightened.

Figure 17:
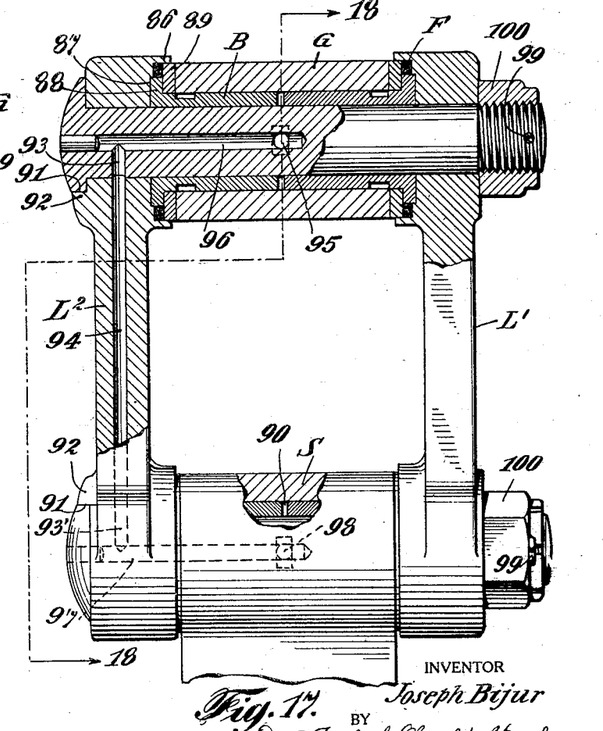
Fig. 17 is a view similar to Fig. 15 of a modification.
Figure 18:
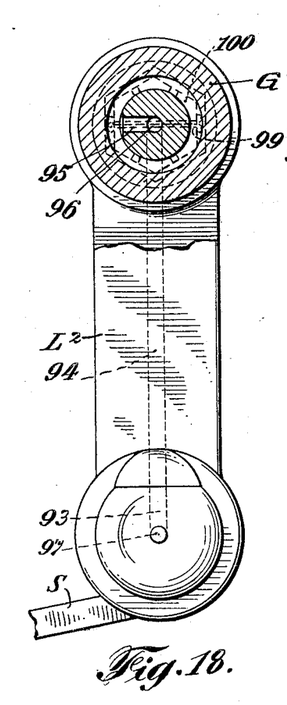
Fig. 18 is a sectional view taken along the line 18—18 of Fig. 17.

In Figs. 17 and 18 I have shown a desirable application to a spring shackle in which the links L' and L² are separate and distinct pieces. In this construction, each link is cupped at its eyes, leaving a peripheral flange 86 and countersunk as at 87 to accommodate the flange 88 of the corresponding bushing element B. The dust-excluding felt ring F fits tight between the flange 86 of the link eye and the rim of the bushing flange 88. The felt, as in previous embodiments, is initially of thickness greater than that shown in the drawings and is compressed in the assembly between the link eye and a clamping metal washer 89 interposed between the flange 88 of the bushing and the spring eye S at the spring end of the link and between the bushing flanges and the forging G at the frame end which mounts the shackle. In this embodiment, as in others, a metallic ring in this case, the flange 86 protrudes beyond the limiting plane of the felt to prevent the dropping of dirt or dust into the construction.

To compensate for wear it is merely necessary to tighten the nut 100. By this adjustment, of course, the links will bodily approach each other, so that no take-up collar or yield of the carrying yoke is required. In taking up for wear, as in the case of previous embodiments, the compression on the oil excluding washers is enhanced.

In Fig. 19 is shown an alternative embodiment of the type of shackle construction shown in Fig. 17. Here, instead of the integral socket machined from the links, I provide relatively flat links into each of which is friction-fitted the hub 121 of a drawn steel member, said member including an annular portion 122 against the face of the link L, and a cylindrical flange 123. By this arrangement, I save weight and the expense of counterboring incurred in the embodiment of Fig. 17. While the construction may otherwise be identical with that of Fig. 17, I have here shown an alternative form, eliminating the use of felt rings and resembling the spring eye construction shown in Fig. 15. The bearing bushing B is provided with a flange 125 of substantial thickness and of maximum diameter at the end thereof against the steel member 122, said diameter but slightly less than the interior of said cup 123 to leave but a minute annular crack, said flange having a portion 126 at the inner part thereof of reduced diameter, which may be substantially that of the spring eye 127. The cylindrical flange 123 of the cup projects beyond the large diameter portion of flange 125, but terminates short of the bearing or spring eye 127. The drawn steel cup being press-fitted into the link L and the bushing B press-fitted into the eye 127 of the frame or spring, foreign matter, such as dirt, dust or water would not enter between the elements of each of these sub-assemblies. Foreign matter is effectively excluded from the thrust bearing between the annular pressed steel member 122 and the bushing flange 125 by reason of the fact that any such matter deposited onto the flange 123 would drop off therefrom, rather than to pass through the small horizontal crack between the rim 123 of the cup and the periphery of flange 125 and, therefore, it would not reach the thrust surface much less the bearing surface between the bolt and the bushing. Of course, instead of making the stepped construction of bushing flange described, the inner part may comprise a separate metal washer clamped between the bushing flange and the eye, substantially as in embodiments previously described.

In a number of the claims the washer F is designated a compression washer, which term is used to designate a washer that when installed is compressed to a thickness less than in uncompressed condition.

It will be noted in Figs. 1, 4, 5, 7, 10, 14, 15 and 17 that the thrust bearing surface at the ends of the bolt or bearing pin adjacent the links or shackle element is completely enclosed by a compressible felt dust and water excluding gasket of approximately rectangular cross section, and that the combination of the felt washer and thrust bearing surface are together enclosed by a metallic structure including a cup member rigid with either the shackle or its link, and/or with the spring eye or frame eye. The felt washer is substantially completely enclosed, and is so positioned in respect to the thrust bearing surface that dust and water would first have to pass into the enclosure and then through the compressed felt washer before it would reach the thrust bearing.

The outer circumferential face and the outer radial face of the felt washer are preferably enclosed by a relatively fixed cup structure rigid with the link shackle or other similar member, while the inner circumferential face of the washer, and in several of the embodiments shown the inner radial face of the washer, contact with the relatively moving structure rigid with the spring eye or with the frame eye.

As shown in Fig. 14 the telescoping concentric metallic structure which encloses the felt gasket and the thrust bearing is formed in and by the bushing and the link or shackle element itself, while in Fig. 17 additional annulus is provided, and in Figs. 1, 4, 5, 7, 10 and 15 both additional annuli and cup members are included with the concentric structure.

The yokes of embodiments of Figs. 1, 5, 15 and 16 although preferably forgings may be constituted in other manners.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In combination, a bearing pin, a bearing member encircling said bearing pin, supporting elements rigid with said bearing pin and beyond said bearing member, dust excluding means associated with the ends of said bearing member, said means including a socket at each end, a separate annular compression plate element of substantially the internal diameter of said socket and associated with the open end thereof, and means for telescoping said plate into said socket, one element of each of said telescoping assemblies being rigid with the bearing, the other rigid with the bearing pin.

2. In combination, a bearing pin, a bearing encircling said bearing pin, metallic socket members concentric with said bearing, one at each end thereof and facing each other, annular compression washers housed within said socket members, annular compression plate elements telescoped with respect to said socket members, and means forcing said elements into said socket members to compress said washers there-between, said elements being rigid with said bearing, said socket members rigid with said bearing pin.

3. In combination, a bearing pin, sustaining means rigid therewith and substantially at the ends thereof, a bearing encircling said bearing pin and rocking relative thereto, said bearing having flanges at the ends thereof, compression washers encircling said flanges, and annular compression plate elements rigid with said bearing pin, reacting against the compression washers to effect substantially uniform compression thereof.

4. In combination, a bearing pin, an annular socket member at each end of said bearing pin snugly encircling the same, a bearing member encircling said bearing pin and having a flange at each end, said flanges contacting said socket members; an annular compression washer encircling each of said flanges and housed within the socket members, annular compression plate elements rigid with said bearing and contacting the faces of the washers otherwise exposed at the sockets, and means drawing said sockets together, whereby the said sockets will telescope over said elements to compress and completely enclose said washers.

5. In combination, a bearing pin, sustaining means rigid therewith and substantially at the ends thereof, a bearing member encircling said bearing pin, dust excluding means associated with the ends of said bearing member, said means substantially interposed between said sustaining means and the ends of said bearing member, each of said dust excluding means including a socket, an annular compression washer therein, and an annular compression member transverse to the axis of the pin associated with the open end of the socket and telescoped therein to compress the enclosed washer when the device is assembled for use, one element of each of said dust excluding means rigid with the bearing, the other substantially rigid with the sustaining means.

6. In combination, a bearing pin, sustaining means rigid therewith and substantially at the ends thereof, an annular socket member at each end of said bearing pin, snugly encircling the same and contacting the sustaining means, said sockets facing each other, a bearing member encircling said bearing pin and having a flange at each end, said flanges contacting said socket members, an annular compression washer encircling each of said flanges and housed within the corresponding socket member, annular compression members transverse to the axis of the pin rigid with said bearing, near the opposite ends thereof and contacting the faces of the washers otherwise exposed at the sockets, and means drawing said sockets together whereby said sockets and said members will telescope to compress and completely enclose the washers.

7. In combination, a bearing pin, sustaining means rigid therewith and substantially at the ends thereof, a bearing encircling said bearing pin, wear thimbles, friction-fitted into opposite ends of said bearing, each having an enlarged end and a metallic plate of diameter larger than said bearing, clamped by the corresponding enlarged end against the bearing, a pair of annular metallic members encircling said bearing pin at each end, one of each of said pair rigid with said sustaining means, the other contacting the enlarged end of the corresponding thimble, an annular compression washer housed in an annular cavity determined by said annular members, means drawing said annular members together against said bearing, the associated annular members at each end having a telescopic relationship to permit compression of said washers.

8. In combination, a bearing, wear thimbles friction-fitted into opposite ends of said bearing, each having an enlarged end and a flat metallic plate of diameter larger than said bearing clamped by the corresponding enlarged end against the bearing end, a bearing pin through said bearing thimbles having a rocking support with respect thereto, means rigid with said bearing pin beyond the ends of said bearing, and annular compression washers interposed between said means and said plates and held under compression and enclosed therebetween.

9. In combination, a bearing, wear thimbles friction-fitted therein, each having a flange at the exposed end, metal plates clamped between said flanges and the bearing ends and protruding beyond the outer periphery of the bearing, a bearing pin extended through said bearing thimbles and having a bearing surface with respect thereto, annular sockets rigid with said bearing pin and contacting the ends of the thimbles, annular compression washers about the thimble ends encircled by the flanges of the sockets, and means drawing said sockets together to telescope over said plates for compression of said annular washers to a thickness limited by the thickness of the thimble flanges.

10. In combination, a bearing having a wear member friction-fitted thereinto, said member having a flange at one end of the bearing, an annular compression plate clamped against the end of the bearing by said flange, a bearing pin through said wear member having a bearing surface with respect thereto; an annular metallic member rigid with said bearing pin and coacting with the flanged end of said wear member, an annular compression washer encircling said flange and maintained under compression between said annular members, the annular members having a telescopic relation with respect to each other to completely enclose the compression washer.

11. In combination, a spring eye, a bushing member comprising a pair of thimbles press-fitted from opposite ends thereof into said eye, each having an integral flange, and an annular compression washer of leather within the eye pressed between the adjacent ends of the bushing members to block escape of lubricant through the gap at the end of the spring eye loop.

12. A spring eye having a bearing bushing of softer metal, press-fitted thereinto and provided with a flange at one end thereof, said bushing having a peripheral groove near said flange at which will terminate any shaving from the metal of the bushing cut, in the process of applying the same.

13. In combination, a spring eye, a pair of bushing thimbles, each provided with a flange and friction-fitted from opposite ends of said eye, each of said thimbles having a peripheral groove therein near the flanged end thereof, to prevent the clamping of a shaving cut from the bushing in the process of application thereof between the spring eye and the flange.

14. A spring eye having a bushing of softer metal provided with a flange at one end thereof and press-fitted into the eye, said bushing knurled at the outer periphery thereof and having a peripheral groove, near said flange.

15. In combination, a yoke structure, a complete bearing assembly lodged between the arms of said structure, a bearing pin through said arms and said bearing assembly, to support the latter, means including a nut on said bearing pin and a spacer for transmitting pressure to maintain the elements of said bearing assembly in close contact, said complete bearing assembly including telescopic metal members for excluding dust from said bearing, the outer of said telescopic members in surface engagement with the structure and with the spacer.

16. In combination, a yoke structure, a complete bearing assembly lodged between the arms of said structure, a bearing pin through said arms and said bearing assembly, to support the latter, a nut on said bearing pin for transmitting pressure to maintain the elements of said bearing assembly against rattling, said assembly including an annular felt washer for excluding dust from said bearing, said washer having an enclosure with a part thereof intervening between the same and the corresponding arm.

17. In combination, a yoke structure, a complete bearing assembly insertable as a unit between the arms of said structure, said assembly including a concentric felt washer near each end, and a thrust washer at the exterior thereof, means maintaining the thrust washers fixed with respect to the corresponding yoke arms, and a bearing pin through said bearing assembly and lodged in said arms, said bearing pin having a nut at one end thereof and a take-up collar through one of the arms of said yoke, exerting pressure against the corresponding thrust washer.

18. A spring eye suspension including a yoke structure, a bearing assembly insertable as a unit between the arms of said yoke, said assembly including a spring eye, wear thimbles friction-fitted thereinto, each having a flange at the exterior thereof, a metal plate encircling each of said thimbles, and clamped between the flange and the end of the eye, annular thrust members against the ends of said flanges, and dust-excluding annular felt washers encircling said flanges, each compressed between the corresponding plate and thrust member, and a bearing pin through said yoke arms and said bearing assembly for sustaining the latter from the former.

19. A spring eye suspension including a yoke structure, a bearing assembly insertable as a unit between the arms of said yoke, said assembly including a spring eye, wear thimbles friction-fitted thereinto each having a flange at the exterior thereof, a metal plate encircling each of said thimbles, and clamped between the flange and the end of the eye, annular thrust members against the ends of said flanges, and dust-excluding annular felt washers encircling said flanges, each compressed between the corresponding plate and thrust member, and a bearing pin through said yoke arms and said bearing assembly for sustaining the latter from the former, the thrust washers being keyed to the yoke structure against movement during spring flexure.

20. A spring eye suspension including a yoke structure, a bearing assembly insertable as a unit between the arms of said yoke, said assembly including a spring eye, wear thimbles friction-fitted therein, each having a flange at the exterior thereof, a metal plate encircling each of said thimbles and clamped between the flange and the end of the eye, annular thrust members against the ends of said flanges, and dust-excluding annular felt washers encircling said flanges, each compressed between the corresponding plate and thrust member, each of said thrust members having a flange encircling the compression washer and telescoped with respect to the plate, and a bearing pin through said yoke arms and said bearing assembly for sustaining the latter from the former.

21. The combination set forth in claim 20 in which the bolt has a head at one end fixed against rotation with respect to the yoke and in which a take-up collar encircles the other end of the bolt and is lodged in the corresponding yoke arm and in which the nut on the bolt exerts take-up pressure through the take-up collar.

22. A spring suspension comprising a yoke structure, a bearing assembly including a spring eye, bearing bushing thimbles friction-fitted thereinto from opposite ends thereof, each having a flange at the exterior thereof, thrust members against the ends of said flanges, each having a flange telescoped over the flange of the thimble, said latter flange having the edge thereof adjacent the spring cut-away, said telescoped flange terminating between the limiting planes of said cut-away part.

23. A spring suspension comprising a yoke structure, a bearing assembly insertable as a unit between the arms thereof, said assembly including a spring eye, bearing bushings press-fitted thereinto, each having a flange at the outer end thereof, said assembly including a metallic dust-proof structure, associated with each of said bushing flanges, said structure including a thrust washer keyed with respect to the corresponding yoke arm and a coacting metallic part concentric therewith, the outer of said parts protruding beyond the part of maximum diameter of the inner of said parts, whereby dust would tend to fall off the outer of said parts and not enter any horizontal crack between said parts.

24. A spring suspension comprising a yoke structure, a bearing assembly insertable as a unit between the arms thereof and constructed and arranged to prevent the dropping of dust to the bearing surface, said bearing assembly including thrust washers at the ends thereof, a bearing pin through said bearing arms and said bearing assembly, a take-up collar through one of said arms, the thrust washer adjacent to said take-up collar being keyed with respect thereto, and a pin through the corresponding yoke arm extending into a corresponding passage-way in said take-up collar to hold the latter against rotation relative to said yoke.

25. In a spring shackle construction, in combination, a unitary element including a pair of parallel links to be sustained by the eye of a vehicle spring at one end and to sustain the eye on a vehicle frame at the other end, bearing elements assembled to said latter eye, the unitary element being adapted to straddle said assembled bearing construction, and a bearing pin passing through said eye and bearing assembly.

26. In a spring shackle construction, in combination, a frame eye, a spring eye, a unitary shackle structure including a pair of parallel links passed over said frame eye at one end thereof, the spring eye being adapted to be inserted between the links at the other end thereof, bearing pins sustaining the parts in assembled relation, each of said eyes having associated parts to improve the effectiveness of operation thereof, said parts assembled thereto prior to applying the shackle and being in non-interfering relationship with respect to shackle application.

27. In a spring shackle construction including a frame eye, a unitary spring shackle structure having a pair of parallel links to straddle said frame eye at one end and a bearing pin extending through corresponding eyes in said links and through said frame eye; the combination in which the frame eye has associated therewith means for excluding dust from the bearing surface thereof, said means when previously assembled to said eye being in non-interfering relationship with respect to the application of the link ends of said shackle structure.

28. In combination, a frame eye, a spring eye, a unitary shackle structure including a pair of parallel links for sustaining the former from the latter, each of said eyes having dust excluding means assembled thereto, said assemblies of combined width no greater than the distance between the links, for facility in assembly.

29. In combination, a frame eye, a spring eye, a unitary shackle structure including a pair of parallel links for sustaining the former from the latter, each of said eyes having dust-excluding means assembled thereto, said assemblies of combined width no greater than the distance between the links, for facility in assembly, the dust-excluding assembly at each end of each of the eyes includes telescoping metal members coaxial with said eyes.

30. In combination, a frame eye, a spring eye, a unitary shackle structure including a pair of parallel links for sustaining the former from the latter, each of said eyes having dust excluding means assembled thereto, said assemblies of combined width no greater than the distance between the links, for facility in assembly, said dust excluding means at each end of each of the bearing pins including a pair of relatively telescoping metal members at each end of each of the eyes in thrust bearing engagement with each other one locked with respect to the structure, the other with respect to the eye, said elements having a close peripheral fit near the thrust surface and substantially greater clearance therebeyond.

31. In combination, a frame eye, a spring eye and a unitary shackle structure including a pair of parallel links for sustaining the former from the latter, each of said eyes having associated parts for enhancing the effectiveness of the bearing, said parts when previously assembled thereto, effecting a combined unit of width no greater than the distance between the links for facilitating assembly, bearing pins extending through said assembled eyes and the associated link ends and wear take-up means comprising collars in the structure encircling the bearing pins to take up wear in the bearing assembly when the nuts of the bearing pins are tightened.

32. In a spring suspension, in combination, a structure, an eye straddled thereby, a bolt through apertures in said structure and through said eye, a split take-up collar in said structure encircling said bolt, said forging being split at said take-up collar, and a bolt to draw the split structure parts together to clamp said split take-up collar upon said bolt in order to retain the latter rigid with respect to the structure.

33. In a spring suspension, in combination, a structure, an eye straddled thereby, said eye having parts assembled thereto to increase the effectiveness of the bearing thereof, said bearing assembly of combined width no greater than the distance between the arms of said structure for facility in assembly, a split take-up collar in one of the arms of said structure, a bearing pin through said collar, through said eye and through the other arm of said structure, said structure being split at the arm carrying said take-up collar, and a bolt drawing said split parts together to cause said split collar to clamp said bearing pin.

34. In a spring suspension, in combination, a yoke structure, an eye straddled thereby, said eye having parts assembled thereto to increase the effectiveness of the bearing thereof, said bearing assembly of combined width no greater than the distance between the arms of said structure for facility in assembly, a split take-up collar in one of the arms of said structure, a bearing pin through said collar, through said eye and through the other arm of said structure, said structure being split at the arm carrying said take-up collar, and a bolt drawing said split parts together to cause said split collar to clamp said bearing pin, said locking bolt extending across a transverse groove in the take-up collar positioned with respect to the split thereof to assure drawing together of said split collar when the locking bolt is tightened.

35. A unitary thrust and longitudinal bearing assembly for a bearing pin adapted to be connected rigidly to an integral yoke structure and to pass through openings in the arms of said yoke comprising an eye member adapted to encircle said bearing pin, bushing means adapted to fit rigidly into said eye and bear upon said bearing pin, a thrust bearing element rigidly connected to said bearing pin and another thrust bearing element unitarily assembled with and outside of said first thrust bearing element with which it cooperates adapted to be rigidly connected to said yoke.

36. A unitary thrust and longitudinal bearing assembly for a bearing pin adapted to be connected rigidly to an integral yoke structure and to pass through openings in the arms of said yoke comprising an eye member adapted to encircle said bearing pin, bushing means adapted to fit rigidly into said eye and bear upon said bearing pin, a thrust bearing element rigidly connected to said bearing pin and another thrust bearing element unitarily assembled with and outside of said first thrust bearing element with which it cooperates adapted to be rigidly connected to said yoke, the second mentioned thrust bearing element consisting of a cup enclosing said first mentioned thrust bearing element.

37. A unitary thrust and longitudinal bearing assembly for a bearing pin adapted to be connected rigidly to an integral yoke structure and to pass through openings in the arms of said yoke comprising an eye member adapted to encircle said bearing pin, bushing means adapted to fit rigidly into said eye and bear upon said bearing pin, a thrust bearing element rigidly connected to said bearing pin and another thrust bearing element unitarily assembled with and outside of said first thrust bearing element with which it cooperates adapted to be rigidly connected to said yoke, a compressible washer being inserted and compressed in the assembly at the edge of the thrust bearing to prevent dirt from working thereinto.

38. In combination, a bearing pin, a bearing sleeve encircling said bearing pin, a bushing between said bearing pin and said sleeve, a link rigidly attached to the end of said bearing pin, a plurality of separate metallic annular plates concentric with and adjacent to an end of said bearing, positioned between and contacting with said sleeve, said link and said bushing, and encircling said bearing pin, means to force the elements of the said plates into telescoping relation and a compression washer enclosed in said structure and compressed thereby to prevent the entry of dirt into the end of the bearing surface.

39. In combination, a bearing pin, a bearing sleeve encircling said bearing pin, a bearing bushing structure therebetween, a separate metallic telescopic annular plate structure including a flat cup and an annular plate closing the mouth of the same at each end of said bearing, of diameter larger than said bearing, an annular compression washer enclosed within each of said telescopic structures, means exerting compression upon the ends of said bearing to draw together said telescopic structures effecting compression of said washers, and metallic means rigid with said bearing to limit the compression of said washers.

40. In combination, a yoke, a spring eye between the arms of said yoke, a bearing pin sustaining said spring eye and lodged at its ends in the arms of said yoke, felt washers encircling the ends of said bearing pin between the inner faces of the yoke arms and the spring eye ends, and means for compressing said washers between a surface rigid with the yoke and another surface rigid with the bearing, said means including a cup and an annular cover therefor and being positioned between said yoke arms and said spring eye end and completely enclosing said washer, one of said enclosing elements being positioned between the yoke and the washer and the other between the eye end and the washer.

41. In combination, a yoke structure, a complete bearing assembly insertable as a unit between the arms of said structure, said assembly including a concentric felt washer near each end, and a thrust washer the edges of which are inwardly flanged at the exterior thereof limiting the compression of the felt washer, means maintaining the thrust washers fixed with respect to the corresponding arms of the yoke including a groove in the contacting face of the yoke arm and a cooperating boss in the corresponding contacting face of the thrust washer, and a bearing pin through said bearing assembly and lodged in said arms.

42. In combination, a yoke structure, a complete bearing assembly insertable as a unit between the arms of said structure, said assembly including a concentric felt washer near each end, and a thrust washer at the exterior thereof limiting the compression of the felt washer, means maintaining the thrust washers fixed with respect to the corresponding arms of the yoke, a bearing pin through said bearing assembly and lodged in said arms, and caps upon the ends of the bearing assembly to hold the assembled elements of the same in position and to enclose them completely on the sides adapted to be placed adjacent the interior sides of the arms of the yoke structure.

43. In a spring shackle construction, in combination, a frame eye, a spring eye, a unitary shackle structure including a pair of parallel links passed over said frame eye at one end thereof, the spring eye being adapted to be inserted between the links at the other end thereof, bearing pins sustaining the parts in assembled relation, each of said eyes having associated parts to improve the effectiveness of operation thereof, said parts assembled thereto prior to applying the shackle and being in non-interfering relationship with respect to shackle application and one of said associated parts being rigid with the unitary shackle structure and another being rigid with the frame eye after final assembly with the shackle.

44. In a spring shackle construction including a frame eye, a unitary spring shackle structure having a pair of parallel links to straddle said frame eye at one end and a bearing pin extending through corresponding eyes in said links and through said frame eye; the combination in which the frame eye has associated therewith means for excluding dust from the bearing surface thereof, said means when previously assembled to said eye being in non-interfering relationship with respect to the application of the link ends of said shackle structure and including caps positioned at the ends of the frame eye enclosing the dust-excluding means and preventing said means from contacting with the interior sides of parallel links during final assembly.

45. In combination, a frame eye, a spring eye, a unitary shackle structure including a pair of parallel links for sustaining the former from the latter, each of said eyes having dust - excluding means assembled thereto, said assemblies of combined width no greater than the distance between the links, for facility in assembly, and including cups, the edges of which extend inwardly away from interior sides of the shackle structure and the bottoms of which are adapted to contact with said interior sides.

46. A dust proof bearing end comprising a bearing element having a wear member friction-fitted thereinto and provided with a peripheral flange at the exposed end thereof; a metal plate encircling said wear member and clamped by said flange against the end of said bearing; a bearing pin through said wear member having a bearing surface with respect thereto; a socket member concentric with said bearing pin and pressed against the end of said wear member and having a groove of diameter substantially that of said metal plate, and a compression washer encircling said wear member flange compressed between the interior of the socket and the plate member.

47. In combination, a bearing member, a wear member friction-fitted thereinto and having a flange there-beyond, a pressure plate clamped by said flange against the end of said bearing and of diameter larger than said bearing, a bearing pin extending through and having a bearing with respect to said wear surface; a plate combination rigid with said bearing pin and contacting said flange, an annular groove in said plate combination of inner diameter substantially equal to the outer diameter of said wear member flange, an annular compression washer lodged in said groove, and means compressing said washer between said plates.

48. The combination set forth in claim 47 in which the pressure plate has a rim telescoped into the groove to enclose the washer.

49. In a spring shackle, in combination, a bearing pin, shackle links rigid therewith, a member in bearing relation with said bearing pin, said member having a pair of friction-fitted wear thimbles therein protruding beyond the ends thereof, an annular compression washer about each of said protruding ends and extending into a corresponding annular groove in the links, the outer periphery of said links in the assembled shackle extending beyond the corresponding compression washer to compress and enclose the same for exclusion of dirt from the bearing, said thimbles and link peripheries being so arranged so as to space said washer from and out of contact with said member in bearing relation with said bearing pin.

50. In a spring shackle, in combination, a bearing pin, shackle links rigid therewith, a member in bearing relation with said bearing pin, said member having a pair of friction-fitted wear thimbles therein, protruding beyond the ends thereof and having flanges, a metal plate clamped by each of said flanges against the corresponding end of the member, the outer peripheries of the eyes of said links in the assembled shackle encircling the metal plates for excluding dirt from the bearing.

51. In a spring shackle, in combination, a bearing pin, shackle links rigid therewith, a member in bearing relation with said bearing pin, said member having a pair of friction-fitted wear thimbles therein with flanges at the outer end thereof, metal plates clamped by said flanges against the ends of said member, an annular compression washer extending into a corresponding annular groove in each of the links and compressed by said plates in the assembled construction, the outer flange of said link-grooves overlapping a part of said plates to completely enclose the compression washers.

52. In combination, a spring eye, a bushing member comprising a pair of thimbles press-fitted from opposite ends thereof into said eye, each having an integral flange at the end thereof, a bearing pin extending through said bushing thimbles, and means for admitting lubricant from an external source to near the flanged end of each of said thimbles, whereby the lubricant must pass the length of said thimble for adequate lubrication of the bearing before any lubricant can escape from between the adjoining ends of said thimbles peripherally through the spring eye.

53. In combination, a spring eye, a bushing member comprising a pair of thimbles press-fitted from opposite ends thereof into said eye, each having an integral flange at the end thereof, a bearing pin extending through said bushing thimbles, an axial bore through said bearing pin for lubricant and radial branches from said bore, one extending to near the flanged end of each of said thimbles.

54. In a spring suspension, in combination, lateral sustaining members, a bearing pin therethrough, a bearing encircling said bearing pin and auxiliary thrust members interposed between said bearing and said sustaining members, said thrust members each having a key coacting with a keyway rigid with the corresponding sustaining member, said keys and keyways being concealed by the thrust bearing structure and substantially inside the outer periphery thereof.

55. In a spring suspension, in combination, a pair of sustaining members, a bearing pin extending therethrough, a bearing encircling said bearing pin, a thrust member at each end of said bearing encircling said bearing pin, and auxiliary locking means retaining said thrust members against movement relative to said sustaining members, said locking means including corresponding openings in said sustaining and thrust members and pins inserted in said openings.

56. In a spring suspension, in combination, a pair of sustaining members, a bearing pin extending therethrough, a bearing encircling said bearing pin, a thrust washer at each end of said bearing encircling said bearing pin, each of said thrust washers having a key lug projection parallel to the bearing pin extending into a keyway upon the portions of the face of the sustaining members covered by said thrust washer therefor.

57. In a spring suspension, in combination, a pair of sustaining elements, a bearing pin extending therethrough, a bearing encircling said bearing pin, a thrust washer at each end of said bearing encircling said bearing pin, each of said thrust washers having a key at the inner periphery thereof extending into a longitudinal keyway therefor in the bearing pin.

58. In a spring suspension, in combination, a pair of sustaining elements, a bearing pin extending therethrough, a bearing encircling said bearing pin, a thrust washer at each end of said bearing encircling said bearing pin, and lock pins transversely through the sustaining members, each protruding into the corresponding thrust washer.

59. In a spring suspension, in combination, a pair of sustaining elements, a bearing pin extending therethrough, a bearing encircling said bearing pin, a thrust washer at each end of said bearing encircling said bearing pin, a floating lock pin transversely through one of the sustaining elements, extending into a corresponding aperture in the corresponding thrust washer, and a protruding member on the bearing pin to maintain said pin against escape therefrom.

60. A spring suspension comprising a yoke structure, a bearing assembly insertable as a unit between the arms of said structure, a bearing pin extending through said arms and said bearing assembly to sustain the latter, said assembly including thrust washers keyed with respect to a longitudinal groove in the bearing pin.

61. A spring suspension comprising a yoke structure, a bearing assembly insertable as a unit between the arms of said structure, a bearing pin extending through said arms and said bearing assembly to sustain the latter, said assembly including thrust washers keyed with respect to a longitudinal groove in the bearing pin, and a lock pin through an arm of said yoke extending into a corresponding opening in the associated thrust washer to maintain the latter against rotation.

Signed at New York city, in the county of New York and State of New York, this 6th day of October, A. D. 1924.

JOSEPH BIJUR.